(12) United States Patent
Caffon et al.

(10) Patent No.: US 6,686,950 B1
(45) Date of Patent: Feb. 3, 2004

(54) DEVICE FOR INSPECTING VENTILATION OR AIR-CONDITIONING CONDUITS, OR OTHER TYPES OF CONDUITS

(75) Inventors: Michel Caffon, 344, ruc Saint Cyr Girier, F-38290 La Verpilliere (FR); Joseph Lanier, Chemin des Dames, F-71680 Vinzelles (FR)

(73) Assignees: Michel Caffon, La Verpilliere (FR); Joseph Lanier, Vinzelles (FR); Commissariat a l'Energie Atomique, Paris (FR)

(*) Notice: Subject to any disclaimer, the term of this patent is extended or adjusted under 35 U.S.C. 154(b) by 0 days.

(21) Appl. No.: 09/486,082
(22) PCT Filed: Sep. 4, 1998
(86) PCT No.: PCT/FR98/01903
§ 371 (c)(1), (2), (4) Date: Jun. 7, 2000
(87) PCT Pub. No.: WO99/13260
PCT Pub. Date: Mar. 18, 1999

(30) Foreign Application Priority Data

Sep. 5, 1997 (FR) ............................................. 97 11260

(51) Int. Cl.$^7$ ............................ H04N 7/18; A47L 15/00
(52) U.S. Cl. ............................. 348/83; 15/304; 348/84
(58) Field of Search .................... 348/83, 84; 15/304

(56) References Cited

U.S. PATENT DOCUMENTS

| 4,107,738 A | * | 8/1978 | Van Norman | 348/84 |
|---|---|---|---|---|
| 4,164,325 A | | 8/1979 | Watson | 239/252 |
| 4,985,763 A | * | 1/1991 | Fraser | 348/84 |
| 5,311,641 A | | 5/1994 | Matsuura et al. | 15/406 |
| 5,584,093 A | * | 12/1996 | Melendres | 15/304 |
| 5,735,016 A | * | 4/1998 | Allen et al. | 15/304 |
| 6,111,600 A | * | 8/2000 | McLeod et al. | 348/84 |

FOREIGN PATENT DOCUMENTS

| DE | 85 13 770 U | 8/1985 |
|---|---|---|
| EP | 0 560 611 A1 | 9/1993 |
| FR | 2 664 184 A1 | 1/1992 |
| FR | 2 715 086 A1 | 7/1995 |
| WO | WO 93/24246 | 12/1993 |

* cited by examiner

*Primary Examiner*—Howard Britton
*Assistant Examiner*—Allen Wong
(74) *Attorney, Agent, or Firm*—Oliff & Berridge, PLC

(57) ABSTRACT

The invention concerns a device in particular for inspecting conduits of ventilating or air-conditioning installations, in connection with the cleaning of said conduits. Said device comprises a mobile head (2), designed to be inserted in the conduit (1) or other duct to be inspected. The mobile head (2) contains a video camera (12) connected to external means for displaying (6) and/or recording images from inside the conduit(1). Said mobile head (2) is also connected by a flexible pipe (4) to an external source of compressed air (5), and comprises means for ejecting air jets (18) directed towards the conduit (1) walls, ensuring the lifting and progression of the mobile head (2) inside the conduit (1).

7 Claims, 2 Drawing Sheets

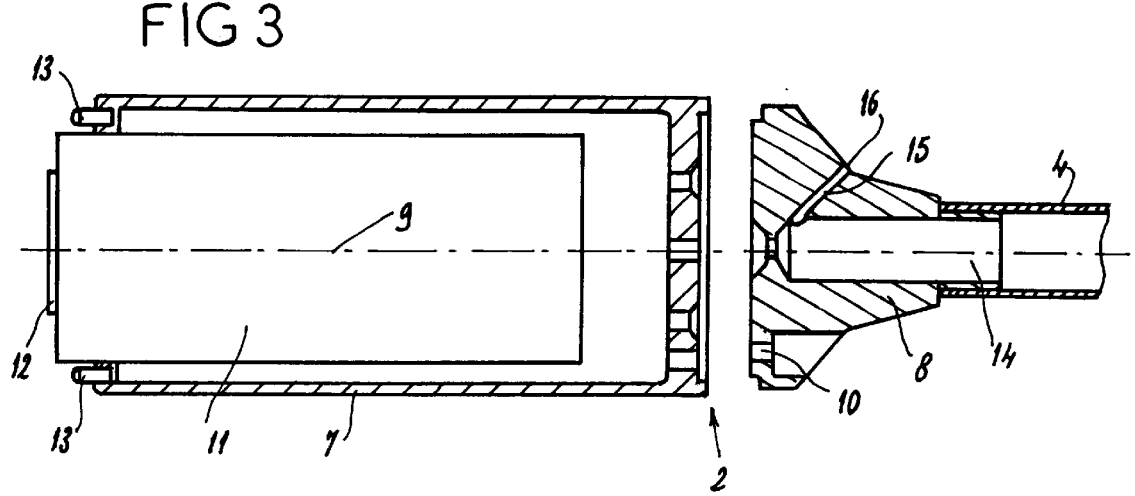
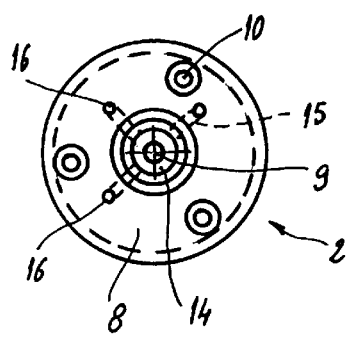

DEVICE FOR INSPECTING VENTILATION OR AIR-CONDITIONING CONDUITS, OR OTHER TYPES OF CONDUITS

The present invention relates to a device for the inspection of ventilation or air-conditioning ducts belonging to ventilation and air-conditioning systems with which, in particular, buildings are equipped, this device also being used for the inspection of other types of conduits, such as those of sewerage networks.

Most existing buildings constructed during the last thirty years are equipped with ventilation or air-conditioning systems which make it possible, on the one hand, to discharge outwards the pollution and contaminated air contained inside the buildings and, on the other hand, to replace this contaminated air by outside air, called new hygienic air. The discharge of the contaminated air and its replacement by new hygienic air are ensured by means of conduits or ducts which form more or less complex networks.

Access to such ventilation or air-conditioning systems, in particular their ducts, especially for inspecting and maintaining them, is difficult because they are located in the false ceilings or the partitions or else are incorporated into the carcass of the buildings. The same access problem arises where other types of conduits, such as buried pipelines, are concerned.

Moreover, the shape of the air ducts or conduits encountered in such systems is highly variable (round, oval, rectangular, square or triangular duct cross sections), and the dimensions of these ducts or conduits are also highly variable and may range, for example, from 80 mm to 1200 mm in diameter for ducts of circular cross section and from 100×50 mm to several square metres for ducts of rectangular cross section, no standard covering the dimensioning of ducts of rectangular cross section. Various materials are used for manufacturing these ducts (sheet metal, concrete, glass fibre, wood, textiles), and the method of assembling the various portions of ducts forming a network is also highly variable (assembly by flanges, by frames, by interlocking, etc.), with or without the interposition of joints which, as soon as the systems are commissioned, give rise to more or less serious leaks.

Furthermore, as the years go by, dust and other particles are deposited on the inner walls of the ducts and give rise to undesirable phenomena involving an increase in the aeraulic pressure drops, whilst at the same time producing conditions which are extremely favourable to the proliferation of microorganisms, and increasing the risks of fire.

There are, admittedly, cleaning methods and apparatuses for ducts or conduits of ventilation and air-conditioning systems. For example, the document WO-93/24246 relates to a device for the pneumatic cleaning of conduits, which is introduced and displaced inside a conduit to be cleaned and which generates a plurality of air jets there by means of nozzles. Under the same heading, mention may also be made of French Patent No. 2,715,086. However, since these cleaning devices act at locations inaccessible to the human eye, such as ducts housed in a false ceiling or incorporated into partitions, or bricked-in vertical hoppers, it is impossible for the operators to check the displacement and effectiveness of such devices visually during use or to verify afterwards the work which has been carried out by these cleaning devices.

Devices for cleaning ventilation ducts by means of air jets or liquid jets are also known, which already comprise a video camera making it possible to inspect the interior of the duct simultaneously—see European Patent Application No. 0560611, U.S. Pat. No. 5,311,641 or German Utility Model No. 8513770. In all these documents, the means for the ejection of air jets or liquid jets, and also the camera, are carried by a carriage which rolls on the bottom of the duct. This solution has many disadvantages:

complexity in the production of the movable assembly which comprises wheels and their drive means;

difficulty or impossibility for the carriage to pass through ducts having small dimensions or ducts in which obstacles are encountered (flow-metering flaps, fire barrier flaps, sound traps);

impossibility for the carriage to pass through some elbows, through branch connections offset in terms of height (with respect to the bottom of the main duct), through vertical ducts or through ducts inclined at a high gradient;

unsuitability of the device, particularly because of its weight, with regard to flexible ducts or ducts made of fragile material, in particular of glass fibres (the fibres being torn off by the wheels of the carriage).

The object of the present invention is to avoid all these disadvantages by providing a device designed for the visual inspection of the ducts or conduits of ventilation and air-conditioning systems, particularly with regard to the cleaning of these ducts, the device proposed by the invention being capable of being used, whatever the dimensions of the ducts to be inspected, the component materials of these ducts, the geometric complexity of the network of ducts of the ventilation or air-conditioning system in question and the direction (horizontal, vertical or oblique) of the conduits to be inspected.

To achieve this, the subject of the invention is a device for the inspection of ventilation or air-conditioning ducts and of other conduits, which comprises essentially a movable head intended to be introduced into a duct or a network of ducts to be inspected or other conduit or network of conduits, the movable head containing a video camera connected to external means for the display and/or recording of the images of the interior of the duct or conduit, and this movable head comprising means for the ejection of air jets, directed towards the walls of the duct or conduit in order to ensure the support and advance of the said movable head, these ejection means being connected to an external compressed-air source.

Such a device thus makes it possible to pick up images of the interior of the ducts, at the same time transmitting them to an operator located at a distance. Preferably, the movable head carries lighting means useful for an optimum pick-up of the images inside the duct, these lighting means advantageously consisting of a series of small lamps or of light-emitting diodes arranged in a circle around the lens of the camera. Preferably, the lighting means have a variable light intensity which is adjustable, in particular, as a function of the cross section of the duct to be inspected and also of the nature of the inner surface or of the component material of this duct or else of its inner covering.

According to a preferred embodiment of the device which is the subject of the invention, the abovementioned ejection means are arranged so as to direct the air jets in an oblique direction opposite to the lens of the camera, in order to advance the movable head inside the duct or conduit to be inspected. A "dynamic" device is thus obtained, which ensures not only the support of the movable head, but also the advance of the latter in the duct, for the purpose of inspecting this duct over a particular length, at the same time eliminating any structure of the carriage type and its disadvantages.

In a practical embodiment, the movable head is composed of a first part of cylindrical and hollow general shape, serving as a housing for the camera and carrying the possible lighting means, and of a second part of frustoconical general shape, attached to the first part and comprising a central compressed-air intake extended by oblique inner channels opening out via compressed-air outlet orifices distributed on the periphery of the said second part. This movable head is connected, by means of a flexible compressed-air pipe joined to its central compressed-air intake, to an external apparatus comprising at least a compressor and a control module with a power source for the camera and/or lighting and with a video monitor.

What is thus obtained as a whole is a device which has small dimensions and a small weight and which is displaced inside the duct or conduit to be inspected by means of the effect of the compressed air projected at high speed and which, during its advance, permanently supplies images of the interior of the duct which are capable of being displayed on the checking video monitor and which, of course, may also be recorded by a video recorder, thus making it possible to ascertain the internal state of the duct. It will also be noted that the air jets ensure by themselves that dust is removed from the inspected duct, the orientation of these jets being such that the dust raised does not obstruct the camera's "vision".

The invention will at all events be understood more clearly from the following description, with reference to the accompanying diagrammatic drawing which, by way of example, illustrates an embodiment of this device for the inspection of ventilation or air-conditioning ducts:

FIG. 3 is a view in longitudinal section of this movable head, the two parts of which have been illustrated here as being parted slightly from one another;

FIG. 4 is an end view of the said movable head.

Figure 1:
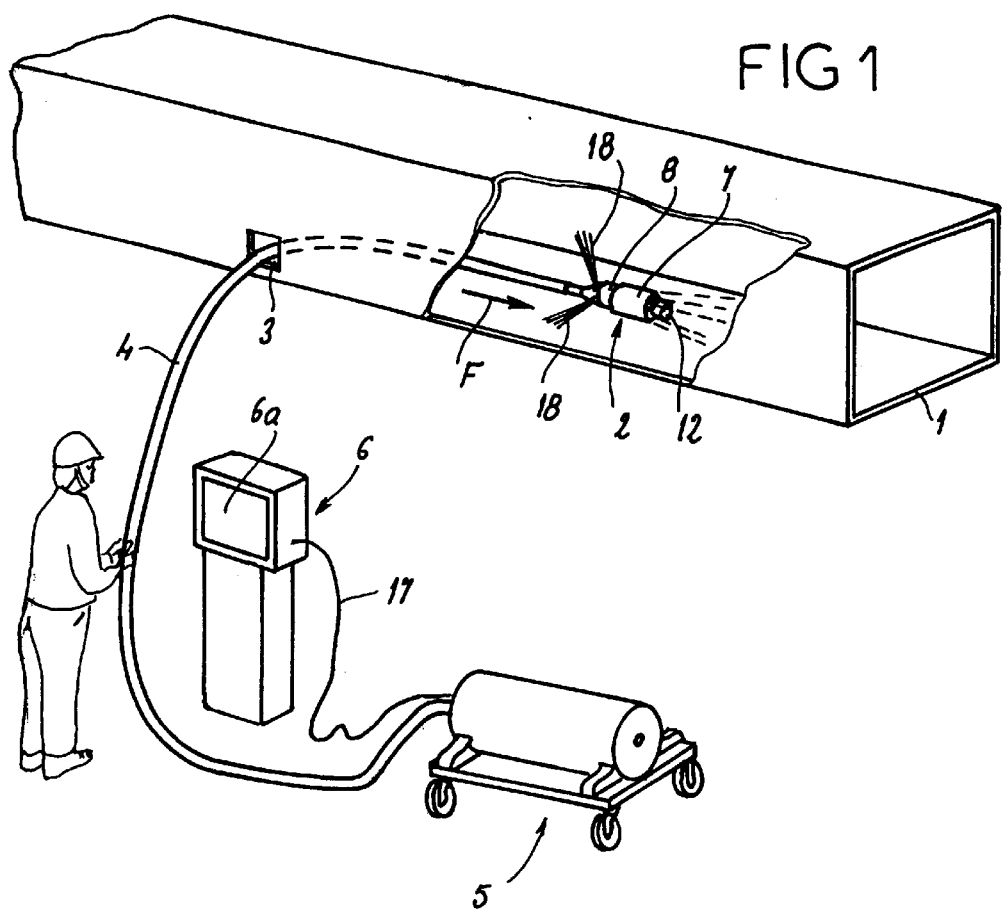
FIG. 1 is a general perspective view of a device according to the present invention, illustrated during use.

FIG. 1 illustrates, as a whole, a device making it possible to inspect the interior of a duct 1 which, in the example under consideration, has a rectangular cross section and belongs to a ventilation or air-conditioning system. The device comprises a movable head 2 introduced inside the duct 1 to be inspected via a lateral aperture 3 in the latter, and connected to an external apparatus by means of a flexible pipe 4 passing through the aperture 3. The said external apparatus comprises, in particular, a compressor 5 and a control and supply module 6, with a video monitor 6a on its front face.

Figure 2:
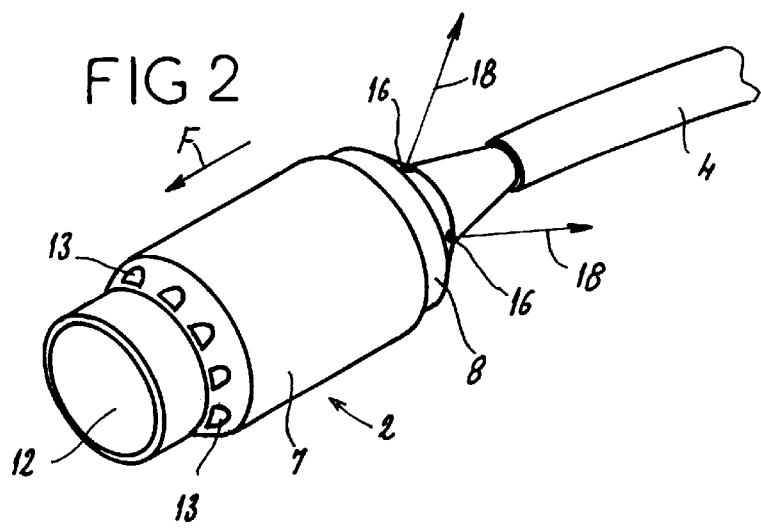
FIG. 2 is a perspective view of only the movable head of the device.

Referring to FIGS. 2 to 4, the movable head 2 is composed of two main parts attached to one another, namely a first part of cylindrical general shape 7 and a second part of frustoconical general shape 8, which are arranged along the same central axis 9 and are assembled to one another by means of screws (not illustrated) introduced into holes 10 parallel to the axis 9.

The cylindrical part 7 has a hollow shape open at its end opposite the frustoconical part 8. This cylindrical part 7 receives internally a small video camera 11 of known type, the lens 12 of which appears at the open end of the said part 7.

The cylindrical part 7 carries, at its open end, a series of small lamps 13 of adjustable light intensity, such as light-emitting diodes, arranged in a circle and at regular angular intervals all around the lens 12 of the camera 11, so as to provide peripheral lighting.

The frustoconical part 8 of the movable head 2 comprises a central compressed-air intake 14 which is extended by a plurality of inner channels 15 opening out on the surface of this frustoconical part 8, so as to form a plurality of compressed-air outlet orifices 16 distributed on the periphery of the said frustoconical part 8. The inner channels 15 are directed obliquely towards the periphery and the rear of the frustoconical part 8, the angle formed by the channels 15 with the central axis 9 being, for example, between 30° and 45°.

The flexible pipe 4 connects the compressor 5 to the compressed-air intake 14 of the frustoconical part 8 of the movable head 2. Also provided between the control module 6 and the movable head 2 are electrical connections, indicated partially at 17 in FIG. 1, which, on the one hand, ensure the supply of electricity to the video camera 11 and the associated lamps 13 and, on the other hand, carry the video signal, provided by the camera 11, to the monitor 6. These electrical connections may pass inside the flexible pipe 4 or be embedded in the thickness of this flexible pipe 4.

During use, as illustrated in FIGS. 1 and 2, the movable head 2 introduced into the duct 1 is supplied with compressed air, for example at a pressure of between 6 and 15 bar and with an air flow of between 20 and 40 cubic metres per hour. The compressed air escapes via the outlet orifices 16 in the form of high-speed jets 18 which strike the faces of the duct 1. By virtue of their inclination, the air jets 18 ensure not only the support of the movable head 2, but also the advance of the latter, in the direction of the arrow F, inside the duct 1.

During the advance of the movable head 2, the camera 11 takes images of the interior of the duct 1, the interior being lit by the lamps 13. These images are transmitted, via the video link 17, to the monitor 6a which enables the operator to display them. Simultaneous recording of the images is also possible.

The movable head 2 can thus move forwards in the duct 1 over the length permitted in the flexible pipe 4, for example over about thirty metres, if appropriate following angles at the same time. In order to make this manipulation easier, the flexible pipe 4 may be unwound by means of a winder. In order to return the movable head 2 to its starting point and, if appropriate, extract it from the duct 1 via the aperture 3, it is sufficient to interrupt the intake of compressed air and to pull on the flexible pipe 4 manually.

Simultaneously with the advance of the movable head 2, the air jets 18 ensure that dust deposited on the walls of the duct 1 is released, without the "vision" of the camera 11 being obstructed.

The scope of the invention would not be exceeded:
- by modifications to details, relating to the shapes and structure of the movable head 2;
- by the addition of auxiliary means, such as means for plotting the orientation of the camera 11, making it possible to improve the functioning of the device;
- by the use, instead of the lamps 13, of special lighting means, in particular of the infrared type, which have the advantage of emitting very little heat;
- by the use of the same device for the inspection of conduits belonging to various networks, in particular the inspection of conduits belonging to sewerage networks, the usefulness of the solution which is the subject of the invention (in comparison with current motorized inspection robots) here being that any motor is eliminated, it becomes possible to inspect pipelines of small cross section and it becomes easier to select the path of the inspection device, in particular at the branches;

by the use of a special camera 11 designed for a special application, such as a "gamma" camera serving for detecting radioactive contamination peaks, this being for the purpose of inspecting nuclear installations.

What is claimed is:

1. Device for the inspection and cleaning of ventilation or air-conditioning ducts and of other conduits, the device comprising: a movable head (2) intended to be introduced into a duct (1) or a network of ducts to be inspected or other conduit or network of conduits, the movable head (2) containing a video camera (11, 12), and this movable head (2) comprising means (15, 16) for the ejection of fluid jets (18), directed towards the walls of the duct (1) or conduit and ensuring the advance of the said movable head (2); external means (6) for the display and/or recording of the images of the interior of the duct (1) or conduit, to which means the video camera (11; 12) is connected; and an external source of fluid under pressure (5), to which the abovementioned ejection means (15, 16) are connected, characterized in that the said external source of fluid under pressure is a compressed-air source (5), and in that the said ejection means (15, 16) are means for the ejection of air jets (18), connected to the compressed-air source (5), the said air jets ensuring not only the cleaning of the inspected duct (1) or conduit and the advance of the movable head (2), but also the support of the said movable head (2).

2. Device for the inspection of ventilation or air-conditioning ducts and of other conduits, according to claim 1, characterized in that the movable head (2) carries lighting means (13).

3. Device for the inspection of ventilation or air-conditioning ducts and of other conduits, according to claim 2, characterized in that the lighting means, carried by the movable head (2), consist of a series of small lamps or of light-emitting diodes (13) arranged in a circle around the lens (12) of the camera (11).

4. Device for the inspection of ventilation or air-conditioning ducts and of other conduits, according to claim 2, characterized in that the lighting means (13) have a variable light intensity.

5. Device for the inspection of ventilation or air-conditioning ducts and of other conduits, according to claim 1, characterized in that the ejection means (15, 16) are arranged so as to direct the air jets (18) in an oblique direction opposite to the lens (12) of the camera (11), in order to make it possible for the movable head (2) to advance inside the duct (1) or conduit to be inspected.

6. Device for the inspection of ventilation or air-conditioning ducts and of other conduits, according to claim 5, characterized in that the movable head (2) is composed of a first part (7) of cylindrical and hollow general shape, serving as a housing for the camera (11) and carrying the lighting means (13), and of a second part (8) of frustoconical general shape, attached to the first part (7) and comprising a central compressed-air intake (14) extended by oblique inner channels (15) opening out via compressed-air outlet orifices (16) distributed on the periphery of the said second part (8).

7. Device for the inspection of ventilation or air-conditioning ducts and of other conduits, according to claim 1, characterized in that its movable head (2) is connected, by means of a flexible compressed-air pipe (4) and by means of electrical connections (17), to an external apparatus comprising at least a compressor (5) and a control module (6) with a power source for the camera (11) and/or the lighting (13) and with a video monitor (6*a*).

\* \* \* \* \*